Dec. 20, 1960     G. ALFIERI     2,965,073
FLUID MOTOR ACTUATOR
Filed Aug. 1, 1958
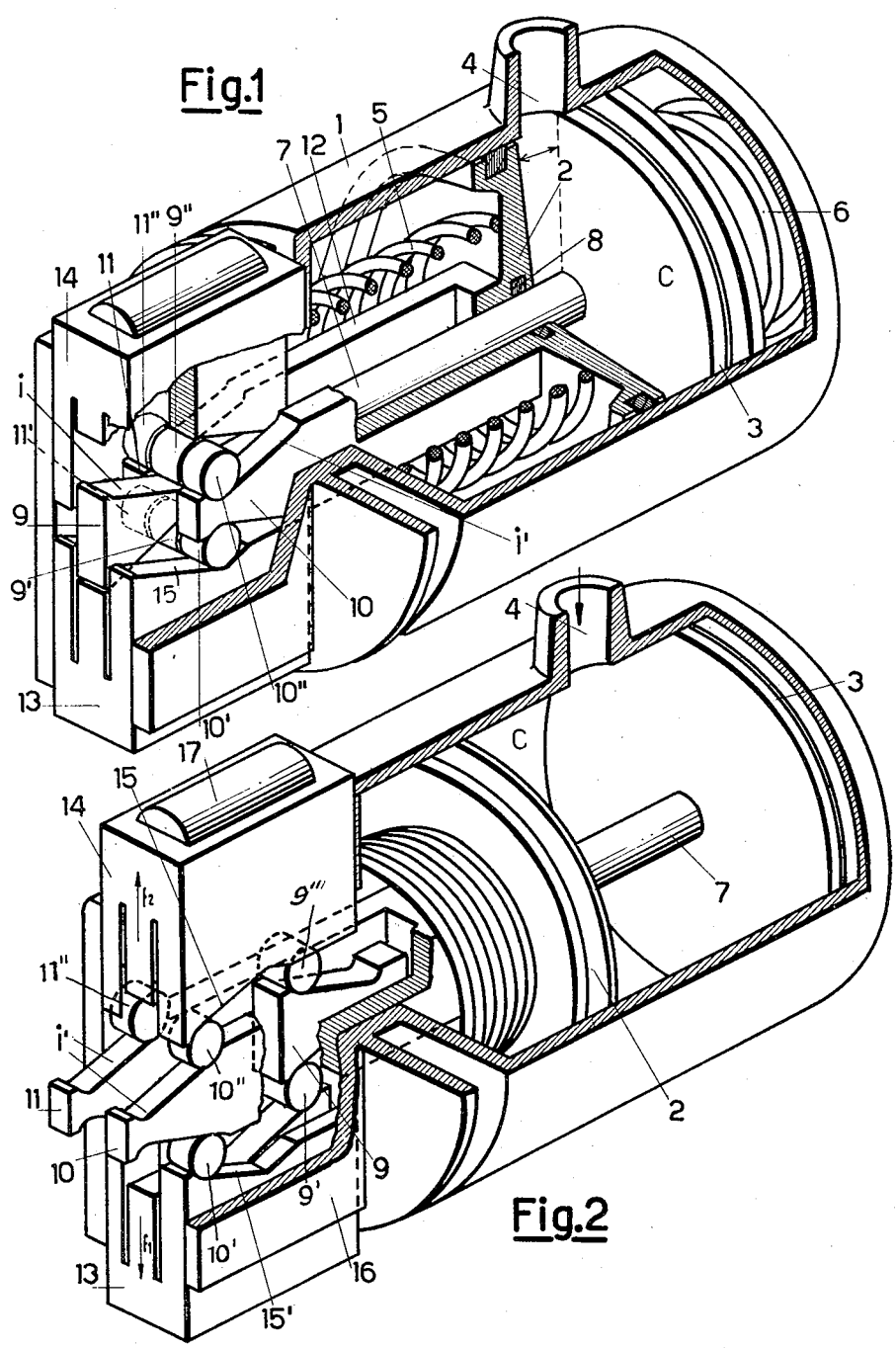

United States Patent Office 2,965,073
Patented Dec. 20, 1960

2,965,073

FLUID MOTOR ACTUATOR

Giuseppe Alfieri, Milan, Italy, assignor to Fabbrica Italiana Magneti Marelli S.p.A., Milan, Italy, a company of Italy Filed Aug. 1, 1958, Ser. No. 752,565

Claims priority, application Italy Aug. 1, 1957

7 Claims. (Cl. 121—38)

This invention relates to control devices for brakes and the like.

In accordance with the present invention there is provided an improved pneumatic control device for the shoes of expanding brakes such as employed, for example, in automotive vehicles being of the type comprising, for example, a cylinder, a piston and a wedge associated with the movement of said piston for the actuation, through special rollers, of the operating elements acting upon the brake shoes.

In this type of device, the shoes are conventionally taken out of rest position when the piston and, therefore, the wedges are actuated mechanically or by means of a fluid under pressure which is introduced into the cylinder.

As is known, however, such devices are subject to the inconvenience of producing reactions which must be resisted by supporting members provided for the various component elements and, moreover, when a fluid is employed, the pressures required must be elevated to the order of 60 to 90 kg./sq. cm. despite the fact that the cylinder-piston assembly may have only minimum space requirements.

It is an object of the present invention to utilize the reaction of external forces to obtain, in concomitance with the forces applied, the force needed for actuating the shoes, and to provide the possibility of employing low-pressure fluid and of employing apparatus of substantially reduced size.

The invention is characterized in that in a feeding cylinder there are accommodated two pistons operated on by a single pressure chamber placed therebetween and substantially in correspondence with the middle zone of the cylinder; in that the pistons have at their control sides, extensions terminated respectively with one and two ends especially shaped; in that, in the active operating stage, said pistons tend to travel away from each other thereby determining a corresponding parallel displacement of the ends and, through the latter ends and through interposed rollers, the normal displacement (mutually away from each other) of control blocks of the free ends of the brake shoes; and in that, in the release stage, by effect of return springs, said pistons and, therewith, the associated ends of said blocks return toward each other. Further features will be illustrated with reference to the accompanying drawing wherein Figs. 1 and 2 are two partially broken away perspective views of a preferred embodiment of the invention, showing the device, respectively, in rest position, and in operative position.

With reference to Fig. 1, 1 indicates the cylinder of the control device and 2 and 3 two inner pistons slidable in opposite directions under the action of a compressed fluid introduced into the chamber C through the connection 4. The numerals 5 and 6 indicate respectively the two return springs for said pistons and 7 a cylindrical rod fixed to the piston 3 and passing longitudinally through the piston 2; sealing around said rod 7 is ensured by the gasket 8. The end 9 of the rod 7 is shaped as a wedge with its section broadening towards the free end. The wedge is placed between the other two parallel wedges 10 and 11 which constitute the end of a fork 12 fixed to the piston 2. The external wedges 10 and 11 are reversed with respect to the central wedge 9; they have, therefore, their tapered portions toward the free ends.

The particular arrangement ensures the axial direction of the thrusts upon the pistons 2 and 3.

On the inclined walls such as $i$ and $i'$ of the wedges 9—10—11 are positioned respective pairs of cylindrical rollers 9'—9"; 10'—10" and 11'—11" which also roll, on the corresponding inclined surfaces of the expansible blocks 13 and 14.

Said rollers constitute the coupling members between the wedges rigid with the pistons and operating members 13—14 acting upon the brake shoes and their presence ensures that the effort exerted by the pistons 2 and 3 is transmitted to the blocks without any substantial friction. The aforesaid coupling exists as three distinct pairs of inclined sliding surfaces: two external (upper and lower) and one internal (upper-lower).

In Fig. 2, which shows the device in the actuating stage, 15 and 15' indicate one of the two external pairs of sliding surfaces of the blocks 13—14 namely, the one associated with the wedge 10.

The other pair, not visible in the figure, is identical. The pair of internal surfaces of the blocks is reversed with respect to the two external surfaces and are sliding surfaces converging at the side spaced from the side of the ends.

The particular shape given to the three pairs of sliding surfaces of the blocks 13—14 not only permits an easy rolling of the roller, but also ensures a more precise displacement of said blocks, the stroke of the pistons and, therefore, of the wedges, remaining equal.

The blocks 13 and 14 are then guided by the box 16 fixed to the cylinder 1. During operation (or braking stage) the introduction of compressed fluid into the chamber C through the conduit 4 increases the spacing of the pistons 2 and 3 and, therefore, the displacement in opposed sense of the wedges 9 and 10—11, as indicated by the arrows $f1$ and $f2$ of Fig. 2. As a consequence the blocks 13 and 14 act with their ends 17 against the inner walls of the brake shoes (not shown) thereby applying a force thereto which is proportional to the pressure of the fluid introduced into the chamber C.

In the releasing stage, since the pressure of the fluid in C diminishes, the action of the return spring of the shoes as well as that of the springs 5 and 6 of the pistons 2 and 3, is such as to make said pistons and the wedges 9 and 10—11 and, therefore, the blocks 13 and 14 and the shoes return to their rest position.

It should be noted that in the actuating stage the displacement in opposed sense of the wedges and, therefore, of the pistons by which they are actuated, causes on the expansible blocks forces which are the sum of the forces generated by each wedge although not causing any external reactions since said forces are balanced by the pressure of the fluid on the facing sides of the two pistons. This allows keeping the dimensions of the cylinder within reduced limits and utilizing at the same time low pressure fluid, of the order of magnitude of 5 to 7 kg. per sq. cm.

Hence it is possible to accommodate the device directly on the shoe-carrying disc, thereby eliminating advantageously the need for supports and transmissions amplifying the force generated by the operating fluid and generally present in conventional devices.

With the present invention one obtains simplicity of application as with direct hydrodynamic controls, joined with the possibility of employing low-pressure fluid as already used as a servo-agent in mechanical and hydrodynamic braking devices in medium and heavy automotive vehicles, in which muscular force of the driver would appear insufficient to generate the necessary braking force on the vehicle.

A practical embodiment of the invention has been described without limitation, it being understood that many variants and modifications are possible according to the requirements of practical application without departing from the scope of the present invention.

What is claimed is:

1. A control comprising a cylinder, spaced pistons axially displaceable in said cylinder and confining a variable pressure chamber therebetween, a rod on one of the pistons, said rod extending through the other of said pistons, a first member rigid on said rod, a second member rigidly connected to said other piston and positioned adjacent said first member, said members having adjacent oppositely inclined surfaces aligned in correspondence with the axis of said cylinder, a displaceable force transmitting device adjacent said members, said device having surfaces facing the said surfaces of said members and inclined in correspondence therewith, means supporting said device for movement transverse to the axis of said cylinders but preventing movement of said device along said axis, and rollers between the surfaces of said members and the surfaces of said device to translate axial displacement of said pistons into transverse displacement of said device.

2. A control as claimed in claim 1 wherein said pistons confine no more than one chamber therebetween.

3. A control as claimed in claim 1 comprising springs in the cylinder acting on each of the pistons.

4. A control as claimed in claim 1 wherein said second member is a fork having legs on each side of said rod and first member, said second member including sections on each said leg and thus on opposite sides of said first member.

5. A control as claimed in claim 4 wherein said first member and the sections of the second member are wedges, the wedges of the second member tapering oppositely to said first member.

6. A control as claimed in claim 1 wherein said means is a guide fixed to said cylinder.

7. A control as claimed in claim 4 wherein said device includes two sections on opposite sides of said members and displaceable in opposite directions.

References Cited in the file of this patent

FOREIGN PATENTS 466,804    Great Britain _____ June 7, 1937